United States Patent [19]
Dornhagen et al.

[11] Patent Number: 5,516,901
[45] Date of Patent: May 14, 1996

[54] PREPARATION OF REACTIVE PHTHALOCYANINE DYES

[75] Inventors: Juergen Dornhagen, Limburgerhof; Manfred Patsch, Wachenheim, both of Germany

[73] Assignee: BASF Aktiengesellschaft, Ludwigshafen, Germany

[21] Appl. No.: 165,162

[22] Filed: Dec. 10, 1993

[30] Foreign Application Priority Data

Dec. 18, 1992 [DE] Germany ............ 42 42 975.7

[51] Int. Cl.$^6$ ............................................. C09B 47/04
[52] U.S. Cl. ..................... 540/133; 540/122; 540/131; 8/661
[58] Field of Search ............................ 540/122, 133

[56] References Cited

U.S. PATENT DOCUMENTS

| | | | |
|---|---|---|---|
| 4,237,050 | 12/1980 | Springer | 260/242.2 |
| 4,576,155 | 3/1986 | Levy | 128/234 |
| 4,689,048 | 8/1987 | Förtsch et al. | 8/524 |
| 4,851,011 | 7/1989 | Lacroix et al. | 8/527 |
| 5,084,068 | 1/1992 | Moser et al. | 540/133 |
| 5,302,708 | 4/1994 | Beck et al. | 540/133 |
| 5,444,163 | 8/1995 | Dornhagen et al. | 540/133 |

FOREIGN PATENT DOCUMENTS

| | | |
|---|---|---|
| 0075905 | 4/1983 | European Pat. Off. . |
| 0231837 | 8/1987 | European Pat. Off. . |
| 0287515 | 4/1988 | European Pat. Off. . |
| 0288434 | 10/1988 | European Pat. Off. . |
| 0302825 | 2/1989 | European Pat. Off. . |
| 2427365 | 12/1979 | France . |
| 2824211 | 12/1979 | Germany . |
| 2906442 | 8/1980 | Germany . |

OTHER PUBLICATIONS

Morrison and Boyd., Org. Chem., 5th Edition., Allyn and Bacon., Inc. 1987 p. 953.
Springer., Chem. Abst 93: 241195t 1980.
Staude, Eberhard, Membranen und Membranprozesse, 1992.
Seko, M., et al., Ion Exchange Membranes, pp. 179–191, "Ion Exchange Membrane Application for Electrodialysis, Electroreduction and Electrohydrodimerisation" 1991.
Strathmann, Dr. H., Trennung Von Molekularen Mischungen Mit Hilfe Synthetischer Membranen, 1979, pp. 76–86.
Pusch, Wolfgang, et al., Agnew. Chem. Int. Engl., 1982, pp. 660–685, "Synthetic Membranes—Preparation, Structure, and Application".

*Primary Examiner*—Mukund J. Shah
*Assistant Examiner*—Pavanaram K. Sripada
*Attorney, Agent, or Firm*—Oblon, Spivak, McClelland, Maier & Neustadt

[57] ABSTRACT

Reactive phthalocyanine dyes are prepared by reacting phthalocyaninesulfonyl chlorides with amines containing a reactive group and subjecting the resulting reaction mixture to a membrane treatment.

5 Claims, No Drawings

PREPARATION OF REACTIVE PHTHALOCYANINE DYES

The present invention relates to a novel process for preparing reactive phthalocyanine dyes by reacting phthalocyaninesulfonyl chlorides with amines containing a reactive group and subjecting the resulting reaction mixture to a membrane treatment.

The reaction of phthalocyaninesulfonyl chlorides with amines containing reactive groups in the presence of nitrogen-containing heterocycles to form reactive phthalocyanine dyes is known; see for example DE-A- 2 824 211, DE-A-2 906 442, EP-A-75 905, EP-A-231 837 or the earlier German Patent Application P 42 38 047.2.

The dyes resulting from these methods of synthesis frequently have application defects. Examples are an inadequate light fastness and unsatisfactory wet fastness properties, in particular a poor fastness to hypochlorite bleaching.

It is an object of the present invention to provide a novel process for preparing reactive phthalocyanine dyes which is simple to carry out and makes it possible to obtain dyes which are free of the application defects mentioned.

We have found that this object is achieved by a process for preparing reactive phthalocyanine dyes of the formula I $$Pc \begin{cases} \left[ SO_2-N-(L-\left(N-\right)_t CO-N-]_m L-SO_2-Y \right]_p \\ \quad\quad\quad R^1 \quad\quad R^1 \quad\quad\quad R_1 \\ \left[ SO_2-N\begin{matrix}R^2\\R^3\end{matrix} \right]_q \\ \left[ SO_3^{\ominus}M^{\oplus} \right]_r \end{cases} \quad (I)$$

where

Pc is the radical of a metal-free or metal-containing phthalocyanine system which may be substituted by chlorine or phenyl, $R^1$ is hydrogen or $C_1$–$C_6$-alkyl, $R^2$ and $R^3$ singly are independently of each other hydrogen, $C_1$–$C_6$-alkyl, which may be interrupted by 1 or 2 oxygen atoms in the ether function, or phenyl, or together are combined with the nitrogen atom joining them together to form a five- or six-membered saturated heterocyclic radical which may contain further hetero atoms, L is $C_2$–$C_4$-alkylene which may be interrupted by an oxygen atom in ether function, naphthylene or a radical of the formula

[structures shown: phenylene with U substituent, –(CH$_2$)$_n$–phenylene with U, and phenylene–(CH$_2$)$_n$– with U]

where U is hydrogen, hydroxysulfonylmethyl or hydroxysulfonyl and n is 1 or 2,

Y is vinyl or a radical of the formula $C_2H_4$—Q, wherein Q is an alkali-detachable group, $M^{\bullet}$ is the equivalent of a cation, m is 0 or 1, p is from 1 to 3, q is from 0 to 3, r is from 1 to 3, and t is 0 or 1, with the proviso that the sum of p, q and r is not more than 4, by reacting a phthalocyaninesulfonyl chloride of the formula II $$Pc \begin{cases} \left[ SO_2Cl \right]_a \\ \left[ SO_3^{\ominus}M^{\oplus} \right]_b \end{cases} \quad (II)$$

where Pc and $M^{\bullet}$ are each as defined above, a is from 1 to 4 and b is from 0 to 3, with the proviso that the sum of a and b is not more than 4, or a mixture of phthalocyaninesulfonyl chlorides of the formula II in any order with an amine of the formula III $$H-N-(L-\left(N-\right)_t CO-N-]_m L-SO_2-Y, \quad (III)$$
$$\quad R^1 \quad\quad R^1 \quad\quad R_1$$

where $R^1$, L, Y, m and t are each as defined above, and optionally with an amine of the formula IV $$H-N\begin{matrix}R^2\\R^3\end{matrix} \quad (IV)$$

where $R^2$ and $R^3$ are each as defined above, in an aqueous medium in the presence or absence of a nitrogen-containing heterocycle, which comprises, after the reaction has ended, subjecting the reaction mixture to a membrane treatment to separate it into an aqueous retentate comprising the dyes of the formula I in concentrated form and an aqueous permeate comprising the salts, the amine of the formula III and optionally the amine of the formula IV.

The reactive phthalocyanine dyes of the process according to the invention are metal-free or metal-containing phthalocyanines. Metal-containing phthalocyanines are in particular copper, cobalt or nickel phthalocyanines. The preparation of the reactive copper phthalocyanine dyes is preferred.

$R^1$, $R^2$ and $R^3$ are each for example methyl, ethyl, propyl, isopropyl, butyl, isobutyl, sec-butyl, pentyl, isopentyl, neopentyl, tert-pentyl, hexyl or 2-methylpentyl.

$R^2$ and $R^3$ may each also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 4-methoxybutyl, 2- or 4-ethoxybutyl, 3,6-dioxaheptyl or 3,6-dioxaoctyl.

$R^2$ combined with $R^3$ and the nitrogen atom joining them together to form a five- or six-membered saturated heterocyclic radical with or without further hetero atoms can be for example pyrrolidinyl, piperidinyl, morpholinyl, piperazinyl or N-($C_1$–$C_4$-alkyl)piperazinyl.

L is for example $(CH_2)_2$, $(CH_2)_3$, $(CH_2)_4$, $CH(CH_3)CH_2$, $CH(CH_3)CH(CH_3)$, $(CH_2)_2O(CH_2)_2$, phenylene, hydroxysulfonylmethylphenylene, hydroxysulfonylphenylene, naphthylene or phenylenemethylene.

$M^{\bullet}$ is the equivalent of a cation. It is either a proton or derived from metal or ammonium ions. Metal ions are in particular the lithium, sodium or potassium ions. Ammonium ions for the purposes of the present invention are substituted or unsubstituted ammonium cations. Substituted ammonium cations are for example monoalkyl-, dialkyl-, trialkyl-, tetraalkyl- or benzyltrialkylammonium cations or those cations which are derived from nitrogen-containing five- or six-membered saturated heterocycles, such as pyrrolidinium, piperidinium, morpholinium, piperazinium or N-alkylpiperazinium cations or their N-monoalkyl- or N,N-dialkyl-substituted products. Alkyl means in general straight-chain or branched $C_1$–$C_{20}$-alkyl which may be substituted by hydroxyl groups and/or interrupted by oxygen atoms in ether function. The ammonium ion can also be derived from the heterocycles mentioned at the beginning.

Preferably the cations are protons or lithium, sodium or potassium ions.

Q is an alkali-detachable group. Examples of such groups are chlorine, bromine, $C_1$–$C_4$-alkylsulfonyl, phenylsulfonyl, $OSO_3H$, $SSO_3H$, $OP(O)(OH)_2$, $C_1$–$C_4$-alkylsulfonyloxy, phenylsulfonyloxy, $C_1$–$C_4$-alkanoyloxy, $C_1$–$C_4$-dialkylamino or a radical of the formula

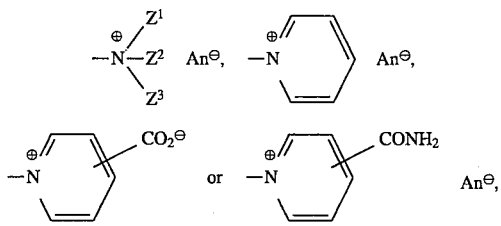

where $Z^1$, $Z^2$ and $Z^3$ are identical or different and are each independently of one another $C_1$–$C_4$-alkyl or benzyl and $An^\ominus$ is in each case one equivalent of an anion. Examples of suitable anions are fluoride, chloride, bromide, iodide, mono-, di- or trichloroacetate, methanesulfonate, benzenesulfonate or 2- or 4-methylbenzenesulfonate.

The nitrogen-containing heterocycle which may be present in the process of the invention can be for example pyridine, a pyridinecarboxylic acid, such as pyridine-2-carboxylic acid, pyridine-3-carboxylic acid, pyridine-4-carboxylic acid, pyridine-2,3-dicarboxylic acid, pyridine-2,4-dicarboxylic acid, pyridine-2,5-dicarboxylic acid, pyridine-2,6-dicarboxylic acid, pyridine-3,4-dicarboxylic acid, pyridine-3,5-dicarboxylic acid, pyridine-2,3,4-tricarboxylic acid, pyridine-2,4,5-tricarboxylic acid, 4-methylpyridine-3-carboxylic acid, 4-ethylpyridine-3-carboxylic acid, 6-methylpyridine-3-carboxylic acid, 4,6-dimethylpyridine-2-carboxylic acid, 2,6-dimethylpyridine-3-carboxylic acid or 2-methylpyridine- 3,4-dicarboxylic acid, a pyridinesulfonic acid, such as pyridine-2-sulfonic acid, pyridine-3-sulfonic acid, pyridine-4-sulfonic acid or 2-methylpyridine-3-sulfonic acid, a pyridinecarboxamide, such as pyridine-2-carboxamide, pyridine-3-carboxamide, pyridine-4-carboxamide, pyridine-2,3-dicarboxamide, pyridine-2,4-dicarboxamide, pyridine-2,5-dicarboxamide, pyridine-2,6-dicarboxamide, pyridine-3,4-dicarboxamide, pyridine-3,5-dicarboxamide, pyridine-2,3,4-tricarboxamide, pyridine-2,4,5-tricarboxamide, 4-methylpyridine-3-carboxamide, 4-ethylpyridine- 3-carboxamide, 6-methylpyridine-3-carboxamide, 4,6-dimethylpyridine-2-carboxamide, 2,6-dimethylpyridine- 3-carboxamide or 2-methylpyridine-3,4-dicarboxamide, a pyridinesulfonamide, such as pyridine-2-sulfonamide, pyridine-3-sulfonamide, pyridine-4-sulfonamide or 2-methylpyridine-3-sulfonamide, a 1-($C_1$–$C_4$-alkyl)imidazole in which the alkyl group may be substituted by $C_1$–$C_4$-alkoxy, such as 1-methylimidazole, 1-ethylimidazole, 1-propylimidazole, 1-isopropylimidazole, 1-butylimidazole, 1-isobutylimidazole, 1-secbutylimidazole, 1-(2-methoxyethyl)imidazole, 1-(2-ethoxyethyl)imidazole, 1-(2-propoxyethyl)imidazole, 1-(2-isopropoxyethyl)imidazole, 1-(2-butoxyethyl)imidazole, 1-(2-methoxypropyl)imidazole, 1-(3-methoxypropyl)imidazole, 1-(2-ethoxypropyl)imidazole, 1-(3-ethoxypropyl)imidazole, 1-(2-methoxybutyl)imidazole, 1-(4-methoxybutyl) imidazole, 1-(2-ethoxybutyl)imidazole) or 1-(4-ethoxybutyl)imidazole, 1-carboxymethylimidazole, 1,2-dimethylimidazole, 1-methyl-imidazole-5-carboxylic acid, 1-carboxymethyl- 1,3,4-triazole, a 4-($C_1$–$C_4$-dialkylamino)pyridine, such as 4-dimethylaminopyridine or 4-diethylaminopyridine, 4-(pyrrolidin-1-yl)pyridine, 4-(piperidin- 1-yl)pyridine, 4-(morpholin-4-yl)pyridine or 4-(piperazin-1-yl)pyridine, a 4-[N-($C_1$–$C_4$-alkyl)piperazin- 1-yl]pyridine, such as 4-(N-methylpiperazin-1-yl)pyridine or 4-(N-ethylpiperazin-1-yl)pyridine, or dimethyltetrazole.

The process of the invention is preferably carried out in the presence of a nitrogen-containing heterocycle, in particular in the presence of a 1-($C_1$–$C_4$ -alkyl)imidazole.

The membrane treatment of the invention encompasses such processes as ultrafiltration, reverse osmosis or electrodialysis.

Preference is given to a procedure in which the reaction mixture is subjected to an ultrafiltration.

Membrane separation techniques are known per se; cf. for example Angew. Chem., Int. Ed. 21, 660, 1982; H. Strathmann Trennung von molekularen Mischungen mit Hilfe synthetischer Membranen, Steinkopf Verlag, Darmstadt, 1979, p. 76 to 86; D. S. Flett Ion Exchange Membranes, Ellis Horwood, Chichester 1983, p. 179 to 191; or E. Staude Membranen und Membranprozesse, VCH Verlags GmbH, Weinheim, 1992.

Suitable membrane materials for carrying out the process of the invention are for example cellulose acetate, polyamide, polyimide, polyacrylonitrile, polytetrafluoroethylene, polystyrene, polyether ketones, polysulfones, regenerated cellulose or sulfonated materials.

The membrane treatment of the invention is advantageously carried out by pumping the reaction mixture into an apparatus holding one or more membranes in the form of wound modules or tubular modules, preferably the latter.

The nominal molecular weight limit (exclusion limit) of the membranes is in general from 300 to 50,000.

The temperature of the reaction mixture submitted to the membrane separation process is in general from 10° to 90° C. preferably from 10° to 60° C., in particular from 20° to 40° C.

The mixture resulting from the first pass is usually continuously recirculated for a period of from 2 to 48 hours under a working pressure of from 2 to 100 bar, preferably from 5 to 40 bar, in particular from 20 to 40 bar, to separate it into an aqueous retentate comprising the dyes of the formula I in concentrated form and an aqueous permeate comprising salts, the amine of the formula III and optionally the amine of the formula IV.

Particular attention has to be drawn to the preparation of reactive phthalocyanine dyes of the formula I where Pc is the radical of a copper phthalocyanine system which is not further substituted, $R^1$ is hydrogen or $C_1$–$C_4$-alkyl, $R^2$ and $R^3$ are each independently of each other hydrogen or $C_1$–$C_4$-alkyl, which may be interrupted by an oxygen atom in ether function, L is $C_2$–$C_3$-alkylene, phenylene or phenylenemethylene, m and t are each 0, and Y, M·, p, q and r are each as defined above.

Of particular note is the preparation of reactive phthalocyanine dyes of the formula I where m is 0, p is from 1.3 to 2.5 and q is 0.

Also of particular interest is the preparation of reactive phthalocyanine dyes of the formula I where m is 0, $R^1$ is hydrogen and L is phenylene.

Also of particular note is the preparation of reactive phthalocyanine dyes of the formula I where q is 0.

Also of particular note is the preparation of reactive phthalocyanine dyes of the formula I where Y is vinyl, 2-sulfatoethyl or 2-thiosulfatoethyl.

The reactive phthalocyanine dyes preparable according to the invention, for example the dyes of the formula I, are in general obtained in the form of mixtures of the individual compounds, for example in the form of mixtures of the individual compounds of the formula I, which individual compounds differ from each other by the degree of substitution of the hydroxysulfonyl groups and sulfonamide groups on the phthalocyanine residue, for example in respect of the formula by the degree of substitution of the radicals with indices p, q and r. Referring to the example of formula I, therefore, the indices p, q and r of the reactive phthalocyanine dye obtained are in general fractions.

The process of the invention is advantageously carried out in an aqueous medium at a pH of from 3.5 to 8.5, preferably from 4 to 8, in particular from 5 to 7, in the presence of an acid acceptor.

The process of the invention can be carried out at from 0° to 60° C. It is preferably carried out at from 10° to 35° C.

Acid acceptors used in the process of the invention are for example hydroxides, carbonates or bicarbonates, secondary or tertiary phosphates, borates or acetates of metals of groups one to three of the periodic table, preferably the sodium and potassium compounds or else calcium compounds.

To improve the solubility of the starting materials or end products in the aqueous reaction medium it is possible to add, if necessary, organic solvents, preferably amides of aliphatic carboxylic acids, such as N,N-dimethylformamide, N,N-dimethylacetamide, N-methyl-pyrrolidin-2-one or 1,3-dimethyltetrahydropyrimid-2-one.

Based on 1 mol of phthalocyaninesulfonyl chloride, the amounts of amine used will in general be from 1 to 8 mol, preferably from 1.5 to 4 mol, of an amine which carries the reactive system and also from 0 to 4 mol, preferably from 0 to 2 mol, of the "non-reactive amine".

If the process is carried out in the presence of a nitrogen heterocycle, the amount used thereof is from 0.1 to 1 mol %, preferably from 0.1 to 0.5 mol %, each percentage being based on the weight of phthalocyaninesulfonyl chloride.

The process of the invention is advantageously carried out by first suspending the phthalocyaninesulfonyl chloride in water in the presence or absence of ancillaries, such as dispersants or antifoams, and then starting with the addition under the abovementioned reaction conditions of the amine which carries the reactive system, optionally the nitrogen-containing heterocycle and optionally the "non-reactive" amine. After the reaction has ended, which in general will take from 6 to 8 hours, the reaction mixture is subjected to a membrane treatment as described earlier. Thereafter the reactive dye can be isolated from the resulting solution, for example by spray drying.

However, it is also possible to use the resulting dye solution directly without further isolation of the resulting dye but after appropriate standardization and with or without the addition of buffer substances, as a liquid brand for dyeing or printing fiber materials.

The process of the invention can be modified by converting some of the sulfonyl chloride groups of the phthalocyaninesulfonyl chloride, for example that of the formula II, into hydroxysulfonyl groups by hydrolysis before, during or after the actual condensation reaction. The condensation can be carried out for example by hydrolyzing some of the sulfonyl chloride groups simultaneously with the reaction of the amines, for example the amine III and/or IV. It is also possible first to react with an amount of amine, for example amine of the formula III and/or IV, that is not sufficient to react with all the sulfonyl chloride groups and then to hydrolyze the remaining sulfonyl chloride groups in a separate reaction step in an acid to weakly alkaline medium, for example at a pH of from 1 to 8, with or without heating, for example at from 20° to 60° C.

The novel process supplies the target products in high yield and purity.

The reactive phthalocyanine dyes preparable by means of the process according to the invention are suitable for dyeing or printing hydroxyl- or nitrogen-containing organic substrates. Substrates of this kind are for example leather or fiber material predominantly comprising natural or synthetic polyamides or natural or regenerated cellulose. They are preferably suitable for dyeing and printing textile materials based on wool or in particular cotton. The dyeings obtained have greenish blue shades and a good lightfastness and good wet fastness properties, in particular a good hypochlorite bleachability.

The Examples which follow illustrate the invention.
The following membranes are employed:
Examples 1 and 5 to 11:
  Membrane 5YM1 based on regenerated cellulose (exclusion limit: 1000) from Amicon GmbH, D-5810 Witten
Examples 2 and 4:
  Membrane Omega 3K based on polyether sulfone (exclusion limit: 3000) from Filtron Molekularfiltertechnik GmbH, D-8757 Karlstein
Example 3:
  Multi-layer membrane MPT30 (exclusion limit: 400) from Membrane Products, Kiryat Weizmann Ltd., Rehovot, Israel

EXAMPLE 1

0.6 mol of copper phthalocyaninesulfonyl chloride (containing about 3.8 sulfonyl chloride groups) was suspended as a moist press cake in 1500 ml of water in the presence of a dispersant. 675 g (2.4 mol) of 4-(2-sulfatoethylsulfonyl)aniline and 5 g (0.06 mol) of 1-methylimidazole were added. Solid sodium bicarbonate was used to maintain the pH at from 6.2 to 6.5 (temperature about 25° C.). The reaction ceased after 7 h. The constitution (in the form of the free acid) was determined as in the following Examples by the method described in Example 1 of U.S. Pat. No. 4,576,755, and was found to be approximately:

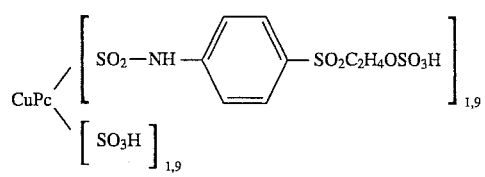

The clear blue solution was divided. One part was directly spray-dried. The other part was subjected to an ultrafiltration using the membrane specified above. Purification was complete when no 4-(2-sulfatoethylsulfonyl)aniline was any longer detectable in the ultraconcentrate by diazotization. The dye was isolable by spray drying. The ultrafiltration-purified dye has distinct application advantages in lightfastness and hypochlorite bleach fastness compared with the untreated dye.

EXAMPLE 2

0.1 mol of copper phthalocyaninesulfonyl chloride (containing about 3.8 sulfonyl chloride groups) was suspended as a moist press cake in 200 ml of water in the presence of a dispersant. 85 g (0.3 mol) of 4-(2-sulfatoethylsulfonyl)aniline and 0.8 g (0.01 mol) of 1-methylimidazole were added. Solid sodium bicarbonate was used to keep the pH at from 6.2 to 6.5 (temperature about 25° C.). The reaction was complete after 7 h. The constitution (in the form of the free acid) is found to be approximately:

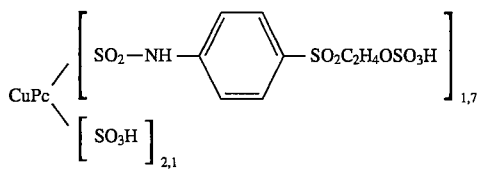

The clear blue solution was divided. One part was directly spray-dried. The other part was subjected to an ultrafiltration using the membrane specified above. Purification was complete when no 4-(2-sulfatoethylsulfonyl)aniline was any longer detectable in the ultraconcentrate by diazotization. The dye was isolable by spray drying. The ultrafiltration-purified dye has distinct application advantages in lightfastness and hypochlorite bleach fastness compared with the untreated dye.

EXAMPLE 3

0.4 mol of copper phthalocyaninesulfonyl chloride (containing about 3.8 sulfonyl chloride groups) was suspended as a moist press cake in 1000 ml of water in the presence of a dispersant. 337 g (1.2 mol) of 4-(2-sulfatoethylsulfonyl)aniline and 3.2 g (0.04 mol) of 1-methylimidazole were added. Solid sodium bicarbonate was used to keep the pH at from 6.2 to 6.5 (temperature about 25° C.). The reaction was complete after 7 h. The constitution (in the form of the free acid) is found to be approximately:

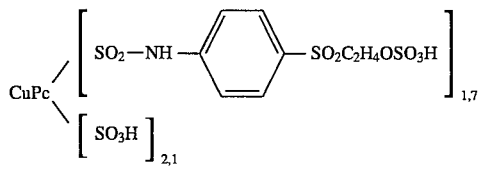

The clear blue solution was divided. One part was directly spray-dried. The other part was subjected to an ultrafiltration using the membrane specified above. Purification was complete when no 4-(2-sulfatoethylsulfonyl)aniline was any longer detectable in the ultraconcentrate by diazotization. The dye was isolable by spray drying or salting out and was stabilized with a phosphate buffer. The ultrafiltration-purified dye has distinct application advantages in lightfastness and hypochlorite bleach fastness compared with the untreated dye.

EXAMPLE 4

450 g (1.6 mol) of 4-(2-sulfatoethyl)aniline were introduced into 500 ml of water in the presence of a dispersant and of an antifoam and solid sodium bicarbonate was used to set the pH of from 6.0 to 6.5. 0.4 mol of copper phthalocyaninesulfonyl chloride (containing about 3.8 sulfonyl chloride groups) was added as a moist press cake, followed by 0.1 mol of 1-methylimidazole. Then solid sodium bicarbonate was added to keep the pH at from 6.2 to 6.5. The reaction was complete after 8 h. The constitution of the dye is found to be approximately:

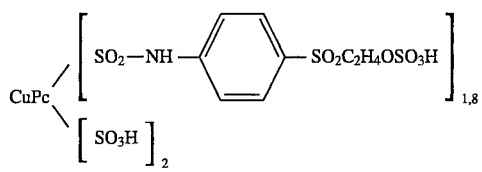

The clear blue solution was divided. One part was directly spray-dried. The other part was subjected to an ultrafiltration using the membrane specified above. The dye was isolable by spray drying. The ultrafiltration-purified dye has distinct application advantages in lightfastness and hypochlorite bleach fastness compared with the untreated dye.

EXAMPLE 5

Example 2 was repeated using instead of the 85 g of 4-(2-sulfatoethylsulfonyl)aniline a mixture of 42 g (0.15 mol) of 3-(2-sulfatoethylsulfonyl)aniline and 42 g (0.15 mol) of 4-(2-sulfatoethylsulfonyl)aniline. The dye obtained had the constitution:

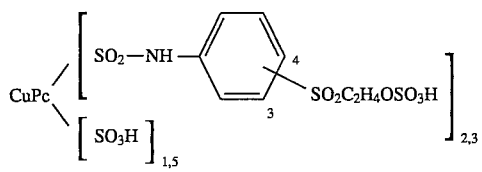

Similar results are obtained with copper phthalocyaninetetrasulfonyl chloride, copper phthalocyaninesulfonyl chloride (containing 3.1 or 3.6 sulfonyl chloride groups) or 3-(2-sulfatoethylsulfonyl)aniline.

EXAMPLE 6

Example 2 was repeated using 85 g (0.3 mol) of 3-(2-sulfatoethylsulfonyl)aniline. The dye obtained had the formula

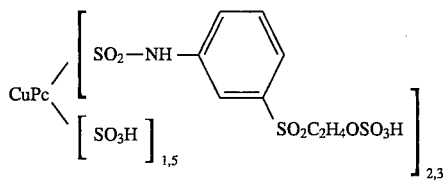

EXAMPLE 7

Example 3 was repeated using 674 g (2.4 mol) of 4-(2-sulfatoethylsulfonyl)aniline. The dye obtained had the formula

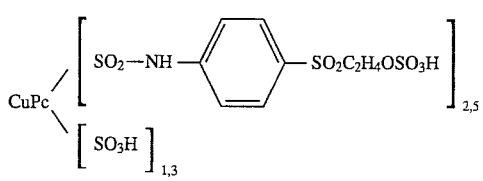

EXAMPLE 8

0.2 mol of copper phthalocyaninesulfonyl chloride (containing about 3.8 sulfonyl chloride groups) was suspended as a moist press cake in 400 ml of water in the presence of a dispersant. 239 g (0.85 mol) of 3-(2-sulfatoethylsulfonyl)aniline and 1.6 g (0.02 mol) of 1-methylimidazole were added. Solid sodium bicarbonate was used to maintain the pH at from 6.2 to 6.5 (temperature about 25° C.). The reaction was complete after 7 h. The constitution (in the form of the free acid) was found to be approximately as follows:

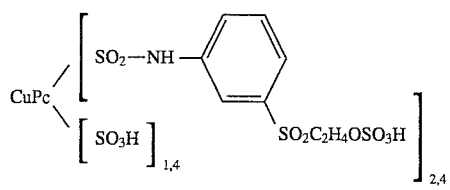

The clear blue solution was divided. One part was directly spray-dried. The other part was subjected to an ultrafiltration using the membrane specified above.

Purification was complete when no 3-(2-sulfatoethylsulfonyl)aniline was any longer detectable in the ultraconcentrate by diazotization. The dye was isolable by spray drying. The ultrafiltration-purified dye has distinct application advantages in lightfastness and hypochlorite bleach fastness compared with the untreated dye.

EXAMPLE 9

0.1 mol of copper phthalocyaninesulfonyl chloride (containing about 3.8 sulfonyl chloride groups) was suspended as a moist press cake in 200 ml of water in the presence of a dispersant. 169 g (0.6 mol) of 3-(2-sulfatoethylsulfonyl)aniline and 0.8 g (0.01 mol) of 1-methylimidazole were added. Solid sodium bicarbonate was used to maintain the pH at from 6.2 to 6.5 (temperature about 25° C.). The reaction was complete after 7 h. The constitution (in the form of the free acid) was found to be approximately as follows:

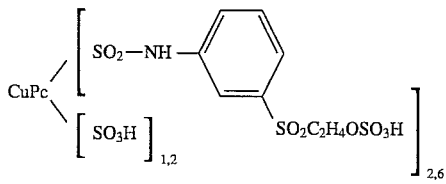

The clear blue solution was divided. One part was directly spray-dried. The other part was subjected to an ultrafiltration using the membrane specified above. Purification was complete when no 3-(2-sulfatoethylsulfonyl)aniline was any longer detectable in the ultraconcentrate by diazotization. The dye was isolable by spray drying. The ultrafiltration-purified dye has distinct application advantages in lightfastness and hypochlorite bleach fastness compared with the untreated dye.

EXAMPLE 10

0.1 mol of copper phthalocyaninesulfonyl chloride (containing about 3.8 sulfonyl chloride groups) was suspended as a moist press cake in 300 ml of water in the presence of a dispersant. 89 g (0.3 mol) of 3-(2-sulfatoethylsulfonyl)aniline and 2.4 g (0.02 mol) of 4-dimethylaminopyridine were added. Solid sodium bicarbonate was used to maintain the pH at from 6.2 to 6.5 (temperature about 25° C.). The reaction was complete after 7 h. The constitution (in the form of the free acid) was found to be approximately as follows:

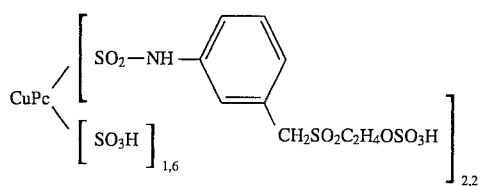

The clear blue solution was divided. One part was directly spray-dried. The other part was subjected to an ultrafiltration using the membrane specified above. Purification was complete when no 3-(2-sulfatoethylsulfonyl)aniline was any longer detectable in the ultraconcentrate by diazotization. The dye was isolable by spray drying and was stabilized with a phosphate buffer. The ultrafiltration-purified dye has distinct application advantages in lightfastness and hypochlorite bleach fastness compared with the untreated dye.

EXAMPLE 11

Example 10 was repeated using 4-(2-sulfatoethylsulfonylmethyl) aniline instead of the 3-(2-sulfatoethylsulfonylmethyl)aniline. The dye obtained had the formula

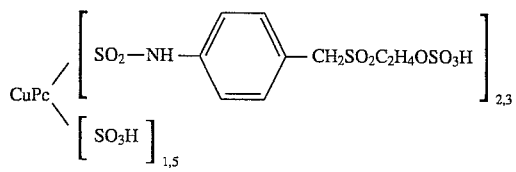

We claim:

1. A process for preparing reactive phthalocyanine dyes of the formula I

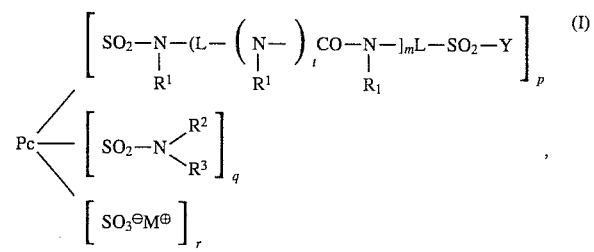

where

Pc is the radical of a metal-free or metal-containing phthalocyanine system which may be substituted by chlorine or phenyl, $R^1$ is hydrogen or $C_1$–$C_6$-alkyl, R² and R³ singly are independently of each other hydrogen, C₁–C₆-alkyl, which may be interrupted by 1 or 2 oxygen atoms in ether function, or phenyl, or together are combined with the nitrogen atom joining them together to form a five- or six-membered saturated heterocyclic radical which may contain further hetero atoms, L is C₂–C₄-alkylene which may be interrupted by an oxygen atom in ether function, naphthylene or a radical of the formula

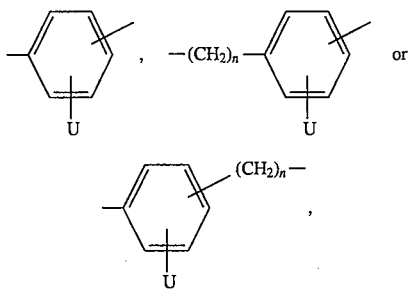

where U is hydrogen, hydroxysulfonylmethyl or hydroxysulfonyl and n is 1 or 2,

Y is vinyl or a radical of the formula $C_2H_4$—Q, wherein Q is an alkali-detachable group, M˙ is the equivalent of a cation, m is 0 or 1, p is from 1 to 3, q is from 0 to 3, r is from 1 to 3, and t is 0 or 1, with the proviso that the sum of p, q and r is not more than 4, by reacting a phthalocyaninesulfonyl chloride of the formula II

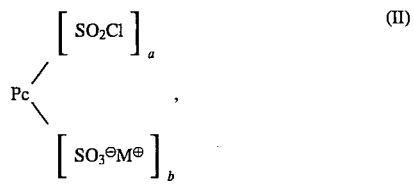

where Pc and M˙ are each as defined above, a is from 1 to 4 and b is from 0 to 3, with the proviso that the sum of a and b is not more than 4, or a mixture of phthalocyaninesulfonyl chlorides of the formula II in any order with an amine of the formula III

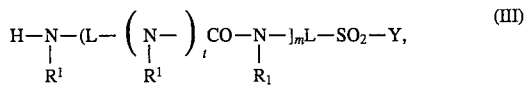

where R¹, L, Y, m and t are each as defined above, and optionally with an amine of the formula IV

where R² and R³ are each as defined above, in an aqueous medium in the presence or absence of a nitrogen-containing heterocycle, which comprises, after the reaction has ended, subjecting the reaction mixture to a membrane treatment to separate it into an aqueous retentate comprising the dyes of the formula I in concentrated form and an aqueous permeate comprising the salts, the amine of the formula III and optionally the amine of the formula IV.

2. A process as claimed in claim 1, wherein the reaction is carried out in the presence of a nitrogen-containing heterocycle.

3. A process as claimed in claim 1, wherein the reaction is carried out at from 0° to 60° C.

4. A process as claimed in claim 1, wherein the resulting reaction mixture is subjected to an ultrafiltration.

5. A process as claimed in claim 1, wherein

Pc is the radical of a copper phthalocyanine system which is not further substituted, R¹ is hydrogen or C₁–C₄-alkyl, R² and R³ are each independently of each other hydrogen or C₁–C₄-alkyl, C₁–C₄-alkyl interrupted by an oxygen atom in ether function, L is C₂–C₃-alkylene, phenylene or phenylenemethylene, m and t are each 0, and Y, M˙, p, q and r are each as defined in claim 1.

* * * * *